Figure 1:
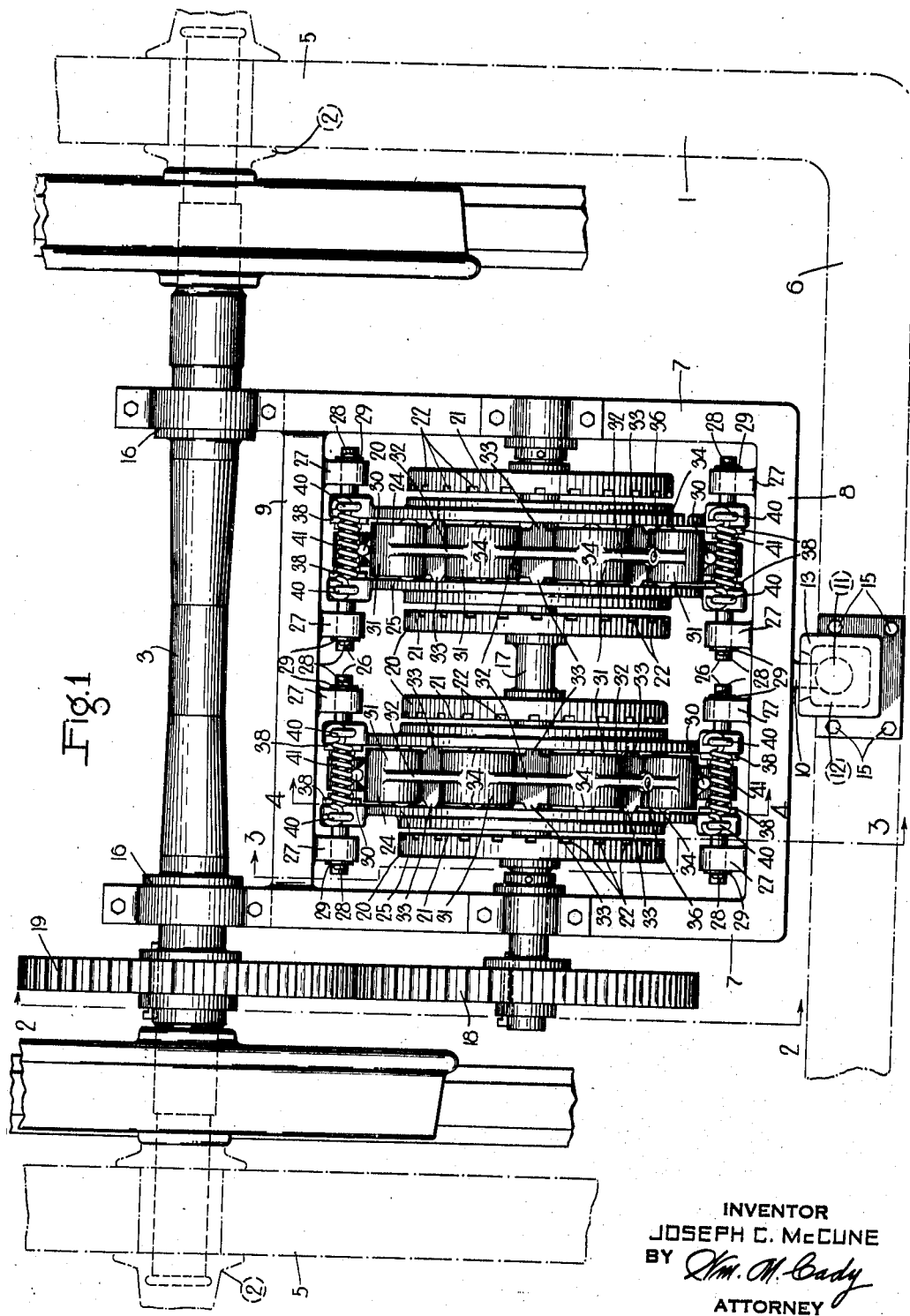

Sept. 26, 1939.  J. C. McCUNE  2,174,409
BRAKE MECHANISM
Filed Dec. 18, 1937  2 Sheets-Sheet 1

INVENTOR
JOSEPH C. McCUNE
BY Wm. M. Cady
ATTORNEY

Sept. 26, 1939.  J. C. McCUNE  2,174,409
BRAKE MECHANISM
Filed Dec. 18, 1937  2 Sheets-Sheet 2

INVENTOR
JOSEPH C. McCUNE
BY Wm. W. Cady
ATTORNEY

Patented Sept. 26, 1939

2,174,409

UNITED STATES PATENT OFFICE 2,174,409

BRAKE MECHANISM

Joseph C. McCune, Edgewood, Pa., assignor to The Westinghouse Air Brake Company, Wilmerding, Pa., a corporation of Pennsylvania Application December 18, 1937, Serial No. 180,609

13 Claims. (Cl. 188—59)

This invention relates to friction disk brake mechanisms, and more particularly to a friction disk brake mechanism of the unit type adapted to be employed in connection with any one or all of a plurality of rotatable member to be braked, for instance, with one or more wheel and axle assemblies of a railway vehicle truck.

It has heretofore been proposed in connection with railway vehicle trucks to either mount the above mentioned type of brake mechanism or unit as a whole on an axle of one or each of the wheel and axle assemblies of the truck or on the truck frame, and it has been further proposed to mount the greater portion of the mechanism on the truck frame and the lesser portion on the wheel and axle assembly. In each of these instances the friction braking elements and the devices for controlling their operation encircle the axle of the assembly. In electric motor driven vehicles or the like where the driving motor is located between the transom of the truck and the axle of at least one of the wheel and axle assemblies it may prove difficult and in some instances impossible to employ any of the above mentioned disk brake mechanisms in such a truck.

The principal object of the invention is to provide a disk brake mechanism for a wheel and axle assembly of a railway vehicle truck which is carried by both the axle of the assembly and the truck frame and in which the brake elements which are adapted to frictionally engage with each other and the means operative to effect such engagement, instead of encircling the axle, are disposed at one side thereof. By reason of this arrangement the disk brake mechanism may be applied to a motor driven wheel and axle assembly without regard to the position of the driving motor.

Another object of the invention is to provide an improved friction disk brake mechanism for a wheel and axle assembly of a railway vehicle truck in which the friction brake elements adapted for interengagement with each other and the means for causing them to interengage are spaced away from the axle and are supported by a structure so arranged and carried by the axle and truck frame that it will move with the truck frame as the truck frame moves vertically relative to the wheel and axle assembly under the influence of unavoidable shocks to which the truck is subjected in transit, variations in load and wear of journal bearings, and a further feature resides in the provision of force transmitting means between the brake element and the assembly which is self-adjusting to compensate for relative movement between the brake elements and the assembly.

Other objects and advantages will be apparent from the following more detailed description of the invention.

Figure 2:
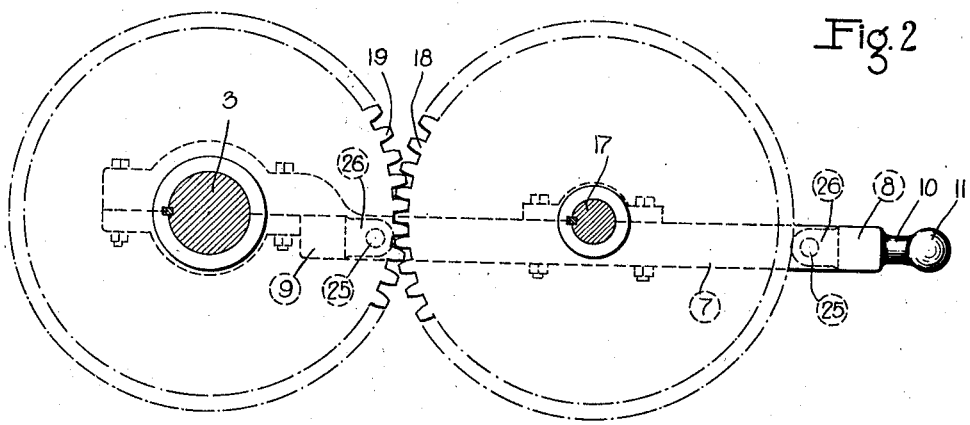
Figure 3:
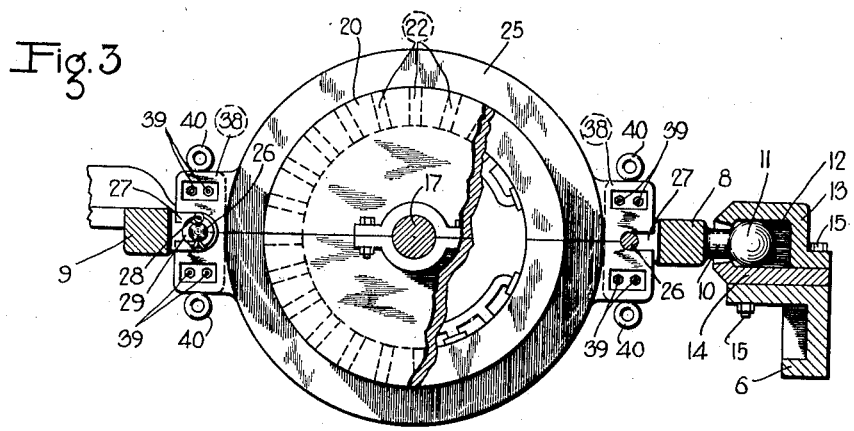
Figure 4:
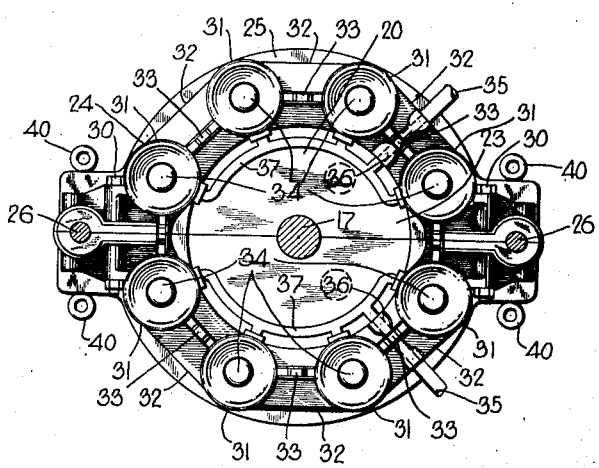

In accompanying drawings Fig. 1 is a plan view of a portion of a railway vehicle truck embodying the invention, the truck frame being shown in dot and dash lines; Fig. 2 is a sectional view taken longitudinally of the truck on the line 2—2 of Fig. 1; Fig. 3 is a sectional view taken longitudinally of the truck on the line 3—3 of Fig. 1, and Fig. 4 is a sectional view taken longitudinally of the truck on line 4—4 of Fig. 1.

As illustrated in Fig. 1, the invention is embodied in a railway vehicle truck having a truck frame 1 which is supported in the usual manner from the journal boxes 2 and consequently from the axle 3 carried by and rotative with the usual wheels, only one wheel and axle assembly, the associated journal boxes and the adjacent parts of the truck frame being shown, these parts being all that is necessary to a clear understanding of the invention.

The truck frame 1 may be of any desired construction but is shown as being of the cast metal type having spaced parallel side frames 5 which are connected together at their ends by transversely extending end pieces 6, only one of which end piece is shown. Adjacent the transverse center line of the truck, the side frames may be connected together by the usual spaced parallel transversely extending transoms, not shown.

Located between the axle 3 and the adjacent end piece 6 of the side frames is my improved disk brake mechanism which may comprise a supporting structure having spaced parallel side members 7 which, adjacent the end piece of the truck frame, are connected together by a laterally extending end member 8 and which, adjacent the axle, are connected together by an end member 9. The end member 8 is provided with a longitudinally extending supporting lug 10 having a ball shaped end 11 which is contained in a socket 12 formed by upper and lower members 13 and 14, respectively, which are removably clamped together and to the end piece 6 of the truck frame by means of bolts 15. The ends of the side members 7 of the supporting structure extend beyond the end member 9 and are journaled on the adjacent axle 3 so that rotary movement on the axle will not be transmitted to the supporting structure. Movement of the supporting structure relative to the axle in directions transversely of the truck frame is prevented by collars 16 which are rigidly carried by the axle and which engage the inner surfaces of the ends of the side members 7.

Extending transversely of the supporting structure intermediate the end members 8 and 9 and rotatably mounted in each of the side members 7 is a brake shaft 17 which is operatively connected to the axle 3 by means of meshing gear wheels 18 and 19 which are located adjacent one side of the supporting structure, the gear wheel 18 being secured to the shaft and the gear wheel 19 being secured to the axle as shown in Figs. 1 and 2.

Secured to the brake shaft 17 so as to be rotatable therewith, are two pairs of spaced brake elements 20, each of which elements has a friction face 21 which is provided with radially extending cross grooves 22 which are open at their outer ends of the atmosphere and at their inner ends to a chamber 23 hereinafter more fully described.

Interposed between each pair of rotatable brake elements and encircling the brake shaft 17 is a brake cylinder device 24 and interposed between each side of each brake cylinder device and each brake element 20 and encircling the shaft 17 is a non-rotatable brake element 25. The brake cylinder device is operative by fluid under pressure to move the non-rotatable brake elements in opposite directions into frictional braking engagement with the adjacent rotatable brake elements, which non-rotatable brake elements are slidably mounted at each side of the brake shaft on a transversely extending bar 26 mounted in spaced inwardly extending lugs 27 carried by the supporting structure. Each bar 26 is held against longitudinal movement relative to the supporting structure by means of cotter pins 28 which pass through the bar and which are engaged by washers 29 interposed between the cotter pins and the lugs 26.

In the present embodiment of the invention the brake cylinder devices are shown as comprising upper and lower substantially segmental sections which are clamped together in end-to-end relationship by means of bolts 30. These brake cylinder sections when thus clamped together firmly grip the bars 26 and are thus held against movement relative to the supporting structure. Each brake cylinder device may be of substantially the same construction as the brake cylinder device shown in the pending joint application of Clyde C. Farmer and myself, Serial No. 170,240, filed October 21, 1937, and in view of this may be here briefly described as comprising a plurality of small spaced radially arranged brake cylinders 31 whose axes extend parallel with the axis of the brake shaft 17, and which are connected together by suitable rib constructions 32. For limiting the release movement of the non-rotatable brake elements the construction 32 is provided on opposite sides with stops 33.

The brake cylinders 31 are provided with a pair of oppositely movable pistons which are each provided with a piston stem 34 for engagement with the adjacent non-rotatable brake element 25. This piston arrangement may be identical with the piston arrangement fully disclosed in the aforementioned pending joint application, and for this reason a showing of the pistons is deemed unnecessary. As also fully disclosed in the joint application, fluid under pressure is adapted to be either supplied to or released from between the faces of the pistons of each section of the brake cylinder devices by way of a conduit 35, a passage 36 in the brake cylinder section and a pipe 37.

The non-rotatable element may comprise upper and lower sections which are connected together in end-to-end relationship by means of a tie-plate 38 which is secured to both sections by bolts 39. The ends of each of these sections are notched so that when they are secured together they define open ended slots at opposite sides of the element, which slots accommodate the bars 26, the width of the slot being such as to provide a free sliding fit between the elements and the bars.

It will here be noted that each pair of rotatable elements, the brake cylinder device and non-rotatable elements disposed between the rotatable elements define the chamber 23 hereinbefore mentioned, which chamber, as will hereinafter more fully appear in the description of the operation of the mechanism, constitutes a part of the ventilating or cooling system for dissipating heat which is generated in the mechanism when the rotatable and non-rotatable brake elements are in frictional braking engagement with each other.

Extending between and operatively connected to the non-rotatable element of each pair of elements through the medium of eye bolts 40 secured to the element are release springs 41 which normally maintain the element in engagement with the stops 33. In the present embodiment of the invention these release springs are arranged one above and one below each bar 26 but it will be understood that if desired additional release springs 25 may be employed which may be disposed in any desired spaced relation about the outer edges of the element.

It should here be mentioned that when for any reason the truck frame moves vertically relative to the wheel and axle assembly the supporting structure and thereby the brake mechanism as a whole will rock about the axle of the assembly to accommodate such movement, and since the supporting structure maintains the brake shaft 17, brake elements, and brake cylinder devices against misalignment due to such movement, the braking effect of the mechanism for any given cylinder pressure will not vary.

In practice the wheel and axle assembly of railway vehicle trucks have a limited movement both longitudinally and laterally of the truck frame and to prevent the brake mechanism from counteracting such movement the socket 12, as shown in Figs. 1 and 3, is made large enough to permit free movement of the mechanism as a whole with the wheel and axle assembly in either direction.

In operation, when it is desired to effect an application of the brake, fluid under pressure is supplied through conduits 35, passages 36 and pipes 37 to the brake cylinders 31 of each brake cylinder device, causing the brake cylinder pistons thereof to move outwardly in opposite directions. As the pistons thus move the stems 34 thereof cause the non-rotatable elements to move in opposite directions to each other into frictional braking engagement with the rotatable brake element. The retarding or braking action produced by reason of such engagement is transmitted to the wheel and axle assembly through the medium of the brake shaft 17 and meshing gear wheels 18 and 19.

When it is desired to effect the release of the brakes fluid under pressure is released from the brake cylinder 31 by way of pipe 37, passages 36 and conduits 35. When the brake cylinder pressure has been reduced to a low degree the release springs 41 act to move the non-rotatable brake elements out of frictional engagement with the rotatable brake element, the elements being brought to a stop in their normal release positions as shown in Fig. 1 by the stops 32.

It will be understood that when the vehicle truck is in motion each of the rotatable brake elements, due to the grooves 22, act as a fan to draw air from the chamber 20 and to pass it across the faces of the brake elements. The air which is thus caused to pass across the faces of the brake elements is adapted to dissipate heat from the elements and to assist in maintaining the faces of the elements free of minute particles of metal worn from the elements during braking operations. As air is drawn from the chambers air flows from the atmosphere to the chamber by way of the spaces between the brake cylinder device and the non-rotatable brake elements. This flow of air from the atmosphere is adapted to dissipate heat from the non-rotatable brake elements and brake cylinder device. The method of cooling and maintaining the several parts of the mechanism clean is substantially the same as fully disclosed in the aforementioned pending joint application and since this method forms no part of the present invention a further detailed description thereof is deemed unnecessary.

It will be noted from the foregoing description that the brake mechanism as a whole for a wheel and axle assembly is carried by both the axle of the assembly and the truck frame, thus relieving the axle of at least one-half of the dead or unsprung weight of the mechanism. By reason of this the severity of the pounding action of the wheels on the track rails by rail joints, cross overs and the like is materially reduced over that produced when the whole dead or unsprung weight of the mechanism is carried directly by the wheel and axle assembly.

In the present embodiment of the invention the supporting structure of the brake mechanism is connected with the truck frame through the medium of single ball and socket connection but it is to be understood that if desired a plurality of such connections may be employed.

While one illustrative embodiment of the invention has been described in detail, it is not my intention to limit the scope to that embodiment or otherwise than by the terms of the appended claims.

Having now described my invention, what I claim as new and desire to secure by Letters Patent, is:

1. In a vehicle brake, in combination, a wheel and axle assembly, a truck frame mounted on said wheel and axle assembly, a brake mechanism for said wheel and axle assembly extending parallel with the axis of the axle of said assembly and located at one side of the axle, said mechanism being rockably supported on said axle and also on the truck frame, and means operatively connecting said mechanism and assembly.

2. In a vehicle brake, in combination, a wheel and axle assembly, a truck frame mounted on said wheel and axle assembly, a brake mechanism comprising a rotatable brake element and a non-rotatable brake element adapted to frictionally interengage to produce braking action, power producing means for effecting the frictional interengagement of said brake elements, means pivotally mounted on said truck frame and the axle of said assembly for supporting said brake elements and power producing means, and means cooperating with said rotatable brake element and axle for transmitting the braking action produced by said elements to said assembly.

3. In a vehicle brake, in combination, a wheel and axle assembly, a truck frame mounted on said wheel and axle assembly, a brake mechanism for said assembly comprising a supporting structure located at one side of the axle of the assembly, said supporting structure being pivotally mounted at one end on said axle and pivotally mounted at the opposite end on the truck frame to provide for universal movement between the structure and frame, rotatable and non-rotatable brake elements carried by said supporting structure adapted to frictionally interengage to produce braking action, means carried by the supporting structure for effecting the frictional interengagement of said brake elements, and means for transmitting the braking action produced by said brake elements to said assembly.

4. In a vehicle brake, in combination, a wheel and axle assembly, a truck frame mounted on said wheel and axle assembly, a brake mechanism for said assembly comprising a supporting structure carried by said truck frame and assembly, said supporting structure being pivotally mounted on the axle of said assembly and being also pivotally mounted on the truck frame, a brake shaft carried by said supporting structure and operatively connected to said assembly to rotate with the assembly, and means carried by the supporting structure operative to oppose the rotary movement of said shaft and thereby the rotary motion of said assembly.

5. In a vehicle brake, in combination, a wheel and axle assembly, a truck frame mounted on said wheel and axle assembly, a brake mechanism for said assembly comprising a supporting structure pivotally carried at one end by said truck frame and pivotally carried at the opposite end by said assembly, a brake shaft carried by said supporting structure in spaced relationship with the axle of said assembly and extending parallel with the axis of the axle, means operatively connecting said shaft and axle adapted to impart rotary motion to said shaft, and means carried by said supporting structure operative to oppose rotation of said shaft and thereby said assembly.

6. In a vehicle brake, in combination, a wheel and axle assembly, a truck frame mounted on said wheel and axle assembly, a brake mechanism for said assembly comprising a supporting structure pivotally carried by said truck frame and assembly, the pivoted connection between the supporting structure and the truck being in the form of a ball and socket, a brake shaft carried by said supporting structure in spaced relationship with the axle of said assembly and extending parallel with the axis of the axle, means for transmitting rotary motion from said axle to said shaft, and means carried by said supporting structure operative to oppose rotation of said shaft.

7. In a vehicle brake, in combination, a wheel and axle assembly, a truck frame mounted on said assembly, a brake supporting structure rockably connected at one end with the axle of said assembly, a ball and socket rockably connecting the other end of said structure with the truck frame, a brake shaft located at one side of the axle and extending parallel with the axis thereof, said shaft being journaled in said supporting structure, means for transmitting rotary motion from said axle to said shaft, a brake element rotatable with said shaft, a non-rotatable brake element movable into braking engagement with the rotatable brake element to produce braking action on said shaft and thereby on said axle, and means operative to move said non-rotatable brake element into frictional braking engagement with said rotatable brake element.

8. In a vehicle brake, in combination, a wheel and axle assembly, a truck frame mounted on said wheel and axle assembly for movement vertically relative thereto, a brake mechanism for said wheel and axle assembly, means operatively connecting said brake mechanism and assembly, and a supporting structure for said mechanism pivotally carried by said truck frame and assembly to permit free movement of the supporting structure and thereby the brake mechanism with the truck frame.

9. In a vehicle brake, in combination, a wheel and axle assembly, a truck frame mounted on said wheel and axle assembly for vertical movement relative thereto, a brake mechanism for said wheel and axle assembly, means operatively connecting said brake mechanism and assembly, and a supporting structure for said mechanism pivotally connected with said truck frame and pivotally connected with said wheel and axle assembly to permit the supporting structure and thereby the brake mechanism to move freely with the truck frame relative to the assembly.

10. In a vehicle brake, in combination, a wheel and axle assembly, a truck frame mounted on said assembly and adapted for movement vertically relative thereto, brake apparatus for said assembly spaced away from the axle of the assembly, said assembly being movable a limited distance relative to the truck frame both longitudinally and transversely of the frame, means operatively connecting the brake apparatus to said assembly and a supporting structure for said brake apparatus so arranged and associated with said assembly and truck frame as to move with said assembly longitudinally and transversely relative to the truck frame and vertically with said truck frame relative to the assembly.

11. In a vehicle brake, in combination, a wheel and axle assembly, a truck frame mounted on said assembly, a brake mechanism for said assembly comprising a supporting structure pivotally mounted on both the assembly and truck frame, a rotatable brake element journaled in said supporting structure and operatively connected to said assembly, a non-rotatable brake element slidably mounted on said supporting structure for movement into frictional braking engagement with said rotatable brake element, and means rigidly carried by the supporting structure operative to move the non-rotatable brake element into frictional braking engagement with the rotatable brake element.

12. In a vehicle brake, in combination, a wheel and axle assembly, a truck frame mounted on said assembly, a brake mechanism for said assembly comprising a supporting structure pivotally mounted on both the assembly and truck frame, a rotatable brake element journaled in said supporting structure and operatively connected to said assembly, a non-rotatable brake element carried by said supporting structure and movable into frictional braking engagement with said rotatable brake element, and fluid pressure responsive means carried by the supporting structure operative to move the non-rotatable brake element into frictional braking engagement with the rotatable brake element.

13. In a vehicle brake, in combination, a wheel and axle assembly, a truck frame mounted on said assembly, a brake mechanism for said assembly comprising a supporting structure pivotally mounted on both the assembly and truck frame, a rotatable brake shaft journaled in said supporting structure and operatively connected to said assembly, said shaft being spaced away from the axle of said assembly and extending parallel with the axis of the axle, a circular brake element secured to said shaft for rotation therewith, a non-rotatable brake element encircling said shaft and slidably carried by the supporting structure for movement into frictional braking engagement with the rotatable brake element, and means encircling the shaft and carried by the supporting structure operative to actuate the non-rotatable brake element.

JOSEPH C. McCUNE.